UNITED STATES PATENT OFFICE.

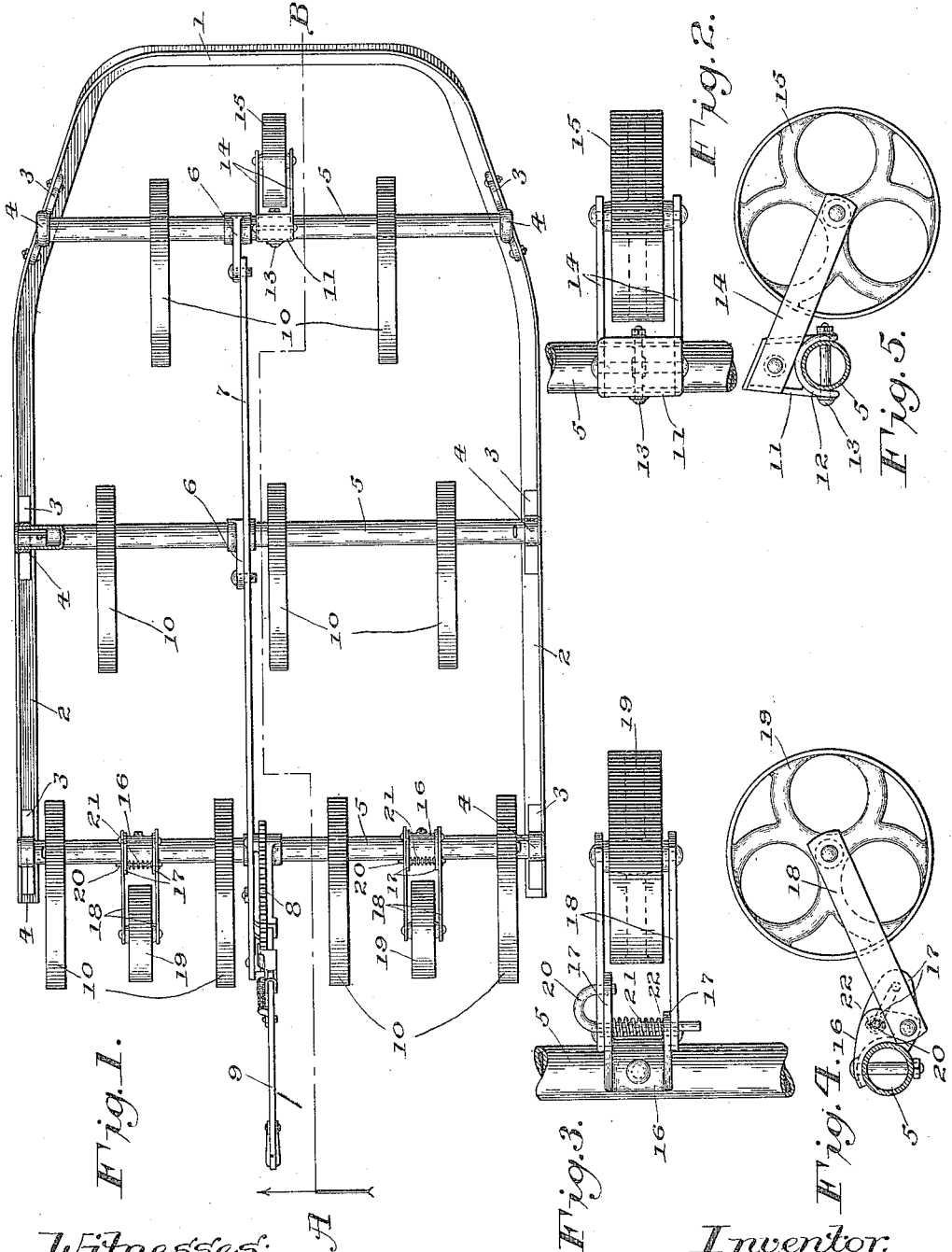

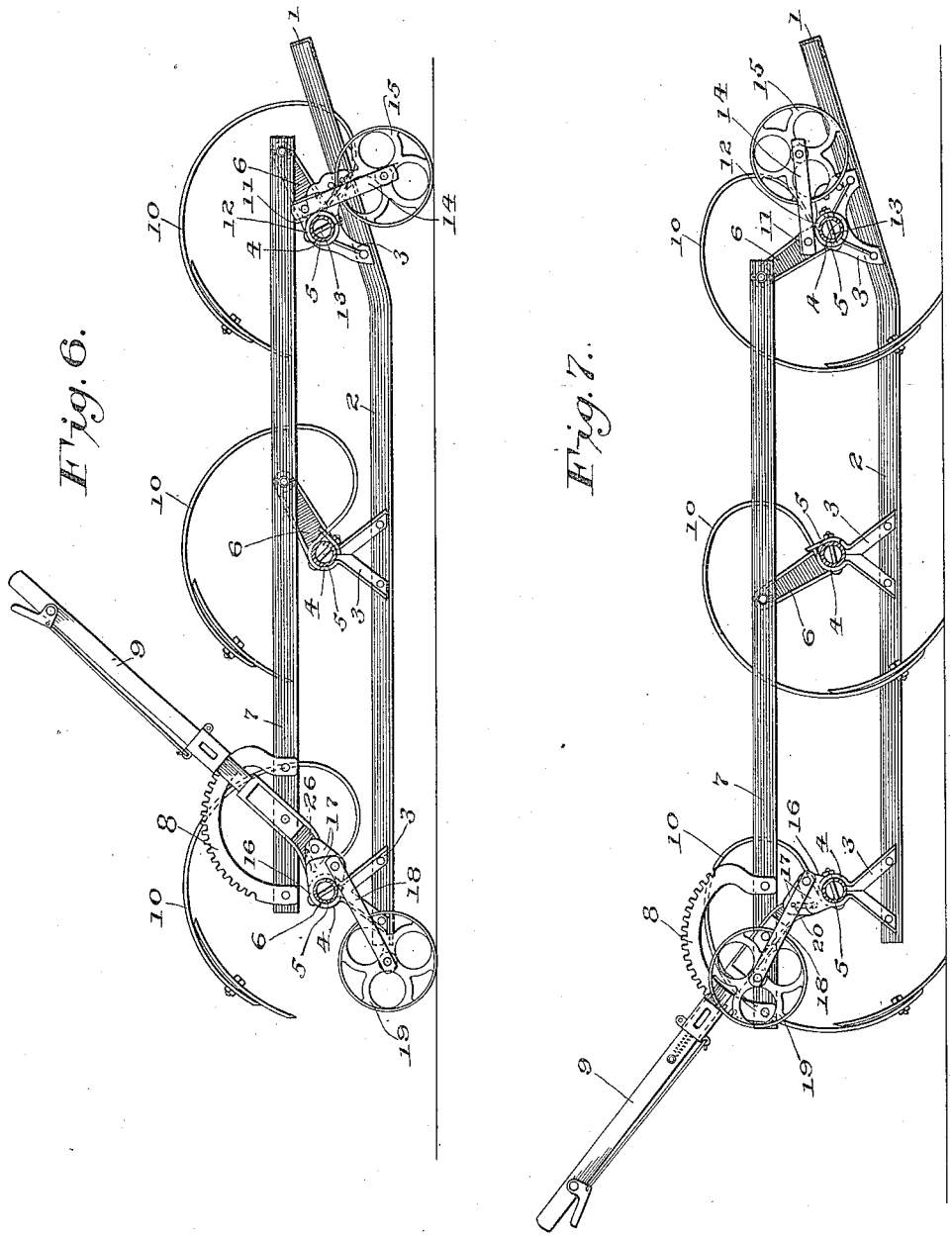

CHARLES S. SHARP, OF AUBURN, NEW YORK, ASSIGNOR TO INTERNATIONAL HARVESTER COMPANY OF NEW JERSEY, A CORPORATION OF NEW JERSEY.

HARROW.

1,157,812.  Specification of Letters Patent.  Patented Oct. 26, 1915.

Application filed August 1, 1912. Serial No. 712,631.

*To all whom it may concern:*

Be it known that I, CHARLES S. SHARP, a citizen of the United States, residing at Auburn, in the county of Cayuga and State of New York, have invented certain new and useful Improvements in Harrows, of which the following is a specification.

My invention relates to harrows in general, and in particular to means whereby the transporting wheels may be readily and quickly placed in position to carry the harrow or be inoperative, as desired; the object of my invention being to provide a harrow simple and strong in construction and readily adjustable from an operative position to one for transportation. These objects are attained by means of mechanism, one embodiment of which is illustrated in the accompanying drawings, in which—

Figure 1 is a top plan view of a harrow having my invention embodied in its construction; Fig. 2 is a detached detail on an enlarged scale showing part of the front turnable tooth carrying bar and the manner of mounting the transport wheel thereon; Fig. 3 is a detached detail on an enlarged scale showing part of the rear turnable tooth carrying bar and the manner of mounting the carrying wheels thereon; the parts being shown in inverted position to facilitate clearness of illustration; Fig. 4 is a side elevation of Fig. 3, the parts being in the inverted position shown therein; Fig. 5 is a side elevation of Fig. 2; Fig. 6 is a longitudinal sectional elevation of Fig. 1 along line A—B and showing the harrow in an inoperative and the carrying wheels in an operative position; and Fig. 7 is a similar elevation as Fig. 6 and illustrating the harrow in an operative position with the carrying wheels raised from the ground.

The same reference characters designate like parts throughout the several views.

The frame of the harrow includes a U-shaped member having a transverse head portion 1, and longitudinally arranged side members 2, to which brackets 3 are secured, having bearings 4 at the upper ends thereof, in which are journaled opposite ends of turnable tooth carrying bars 5 having arms 6 secured to the middle portion thereof, and 7 represents a bar pivotally connected with the arms.

8 represents a toothed sector secured to the rear end of the bar 7 and coöperating with a hand lever 9 pivotally connected with said bar and secured to one of the arms 6 in a manner to retain the turnable tooth carrying bars 5 in any position desired, and 10 represents spring teeth secured to the turnable bars.

11 represents a box-like bracket member having a saddle portion 12 that receives the middle portion of the front tooth carrying bar, to which the bracket is secured by means of a bolt 13.

14 represents forwardly extending arms having the rear ends thereof secured to the bracket, and 15 represents a carrying wheel journaled between opposite ends of said arms.

16 represents transversely spaced bracket members secured to the rear tooth carrying bar and provided with outstanding ear members 17. To each set of these ears 17 is pivotally connected one end of wheel carrying arms 18 having a carrying wheel 19 journaled between opposite ends thereof.

20 represents a U-shaped sliding detent carried by the bracket members 16, having a compression spring 21 encircling one of the legs thereof and operative between a pin 22 and one of the ear members 17 in a manner to yieldingly press the detent in a direction to cause the opposite leg to engage with one of the bars 18 and an opening in one of the ears in a manner to lock the bars against a swinging movement when the harrow teeth are in operative position and the wheel carriers are turned upward and rearward, as shown in Fig. 7.

The operation of the mechanism will now be described.

With the parts in the position shown in Fig. 6, wherein the tillage members 10 are in their inoperative position and the wheels 15 and 19 engage the ground, when the operator desires to throw the tillage members into engagement with the ground, he throws the lever 9 to the left. Through the bar 7 and arms 6, the tooth-carrying bars 5 are thus rotated in a counter-clockwise direction in such a manner as to lower the teeth 10. As this movement continues, the front wheel 15, through its connection to the front arms 6, will obviously be raised upward and forward toward the position shown in Fig. 7, and the rear wheels 19 will be thrown forward and beneath the frame until they occupy a position in front of the rear bar 5, with their arms 18 in a position substantially at right angles to the position shown in Fig. 6 and their rims resting upon the ground. When in this position the operator may then readily raise the wheels 19 to the position shown in Fig. 7 and lock them in that position by the detent 20. With the parts occupying the position shown in Fig. 7, when the operator wishes to raise the implements 10 out of the ground and prepare the machine for transport, he swings the lever 9 to the right. During this movement the wheel 15 will obviously move downward from the position shown in Fig. 7 toward the position shown in Fig. 6 and the wheels 19, through the detent 20, will be moved over with the lever 9 to a position substantially at right angles to the position shown in Fig. 7. When in this position the operator may obviously disconnect the wheels 19 by releasing the detent mechanism 20, whereupon the wheels will drop upon the ground in such a position that as the harrow moves forward, they will be pulled back under the rear end of the frame until they occupy the position shown in Fig. 6.

In this construction it is to be noted that when desired the operator, during transport, may use only the wheel 15, the rear end of the lower frame 2 then dragging upon the ground. When, however, it is desired to raise the rear end of the frame to the position shown in Fig. 6 after the operator has moved the wheel 15 to its transport position, he may readily throw the wheels 19 to their transport position by simply disconnecting the detent 20, the forward movement of the machine acting to swing the wheels backward and underneath the frame to their transport position. In fact, by this construction it is to be noted that the operator is not required to lift the harrow at all, but only to throw the front wheel 15 down into contact with the ground, release the detent mechanism 20 so that the wheels 19 rest upon the ground, and then hold the sector detent released as the team moves forward, whereupon the forward movement of the wheels over the ground turns these wheels into their operative positions shown in Fig. 6. Attention is also directed to the fact that by means of the detent mechanism, the wheels 19, when in their inoperative position, are securely held against a swinging movement with respect to the frame. Further, when in their operative position, it is to be noted that due to the fact that their arms 18 then underlie the rear bar 5 and engage therewith, a substantial frame support is provided.

While I have in this application specifically described one embodiment of my invention, it is, of course, to be understood that the form shown herein is susceptible of modification and that the invention may be embodied in other forms without departing from its spirit.

What I claim as my invention, and desire to secure by Letters Patent, is:

1. In a tillage implement, a frame, a bar journaled thereon, an implement carried on said bar, a lever for rotating said bar fixed thereto, a transport wheel, a forwardly protruding bracket rotatable with said bar, and a rigid draft connection for said transport wheel pivotally connected to said bracket at a point in front of said bar and extending rearwardly therefrom beneath the latter.

2. In a tillage implement, a frame, implements carried thereon, transport wheels carried thereon, manually operated means for moving one of said elements toward operative position as the other is moved toward inoperative position, and means operable independently of said first mentioned means and after a predetermined movement thereof whereby upon a forward movement of the frame the movement of one of said elements is automatically completed.

3. In a tillage implement, a frame, a rocking bar journaled thereon, an implement carried on said bar, a draft connection pivotally connected to said bar and disposed rearwardly beneath the same in supporting engagement therewith, a transport wheel rotatably mounted on said draft connection at a point in rear of said bar, and means for rotating said draft connection with said bar and thereby drawing said wheel forward beneath said bar to a position in front of the latter.

4. In a tillage implement, a frame, a rocking bar journaled thereon, an implement carried on said bar, a draft connection pivotally connected to said bar and disposed rearwardly beneath the same, a transport wheel rotatably mounted on said draft connection at a point in rear of said bar, a lever fixed to said bar, and operative connections between said lever and said draft connection whereby upon manipulation of said lever said transport wheel is drawn forward beneath said bar to a point in front of the latter.

5. In a tillage implement, a frame, a bar journaled thereon, a bracket carried on said bar and rotatable therewith having a plurality of parallel laterally extending arms, a transport wheel, draft links therefor pivoted to the arms of said bracket, and means comprising laterally retractible adjustable detent mechanism carried on said bracket for positioning said draft links in a predetermined position with respect to said bracket.

6. In a tillage implement, a frame, a plurality of bars journaled therein, implements carried on said bars, a transport wheel rigidly connected to one of said bars, operative connections for rotating said bars including a swinging lever fixed to one of the same, a draft connection pivotally connected to another of said bars and disposed rearwardly beneath the bar carrying the same, a transport wheel journaled at the rear end of said draft connection, and detent mechanism for positioning said draft connection and transport wheel with respect to said lever when in inoperative position.

7. In a tillage implement, a frame, a bar journaled thereon, a bracket carried on said bar, means for rotating said bracket, a transport wheel, an upwardly and forwardly disposed draft connection between said transport wheel and said bracket pivotally connected to said bracket and acting as a support for said bar when said transport wheel is in engagement with the ground at a point in rear of said bar, and means for locking said draft connections against a swinging movement with respect to said bracket when said transport wheel and draft connection have been turned into operative position.

8. In a tillage implement, a frame, a bar journaled thereon, an implement carried on said bar, a lever fixed to said bar and movable therewith to rotate said implement about an axis on said frame, a transport wheel, draft links therefor pivotally connecting said transport wheel to said bar, said links underlying said bar and acting as a support therefor when said transport wheel is in operative position at the rear of said bar, and detent mechanism for positioning said links in substantially parallel relation to said lever when said transport wheel is in inoperative position and said implement is in engagement with the ground.

9. In a tillage implement, a frame, a bar journaled thereon, a bracket fixed to said bar and rotatable therewith, said bracket having laterally disposed arms of unequal length, a plurality of draft members, a transport wheel journaled at one end of said draft members and between the same, and a spring pressed slidable pivot pin connecting the opposite ends of said draft members to the arms of said bracket, said pivot pin having a hook therein receivable in registering openings in the longer of said bracket arms and one of said draft members when said draft members are adjusted to a predetermined angular position with respect to said bracket.

10. A harrow having, in combination, a main frame, a series of turnable tooth carrying bars mounted upon said frame, a bracket secured to the middle portion of the front tooth carrying bar, arms secured to said bracket, a carrying wheel journaled between said arms, brackets secured to the rear tooth carrying bar and provided with ear members spaced apart laterally, arms having one end thereof pivotally connected with said ears, carrying wheels journaled between opposite ends of said arms, and a spring-pressed sliding detent carried by said ear members and adapted to engage said arms in a manner to lock them against a swinging movement relative to said brackets.

CHARLES S. SHARP.

Witnesses:
   K. T. ELLIOTT,
   HUGH S. WYLLIE.

Copies of this patent may be obtained for five cents each, by addressing the "Commissioner of Patents. Washington, D. C."